United States Patent
Harris

(10) Patent No.: US 6,799,717 B2
(45) Date of Patent: Oct. 5, 2004

(54) DOCUMENT AUTO-ROUTING USING A DIGITAL TRANSMITTER COVER SHEET

(75) Inventor: Rodney C. Harris, Fort Collins, CO (US)

(73) Assignee: Hewlett-Packard Development Company, L.P., Houston, TX (US)

(*) Notice: Subject to any disclaimer, the term of this patent is extended or adjusted under 35 U.S.C. 154(b) by 0 days.

(21) Appl. No.: 10/167,190

(22) Filed: Jun. 10, 2002

(65) Prior Publication Data

US 2003/0226885 A1 Dec. 11, 2003

(51) Int. Cl.[7] .............................................. G06F 17/00

(52) U.S. Cl. ...................... 235/375; 235/382; 382/317; 358/434

(58) Field of Search ................................. 235/375, 382, 235/317, 379, 435; 358/434, 438, 440, 444

(56) References Cited

U.S. PATENT DOCUMENTS

| | | | | |
|---|---|---|---|---|
| 4,893,333 A | * | 1/1990 | Baran et al. | 379/100.11 |
| 5,247,591 A | | 9/1993 | Baran | |
| 5,404,231 A | | 4/1995 | Bloomfield | |
| 5,438,433 A | | 8/1995 | Reifman et al. | |
| 5,659,164 A | * | 8/1997 | Schmid et al. | 235/375 |
| 5,754,308 A | * | 5/1998 | Lopresti et al. | 358/403 |
| 5,914,953 A | | 6/1999 | Krause et al. | |
| 6,002,491 A | * | 12/1999 | Li et al. | 358/436 |
| 6,330,976 B1 | | 12/2001 | Dymetman et al. | |
| 6,374,291 B1 | * | 4/2002 | Ishibashi et al. | 709/206 |
| 6,424,426 B1 | * | 7/2002 | Henry | 358/1.15 |

* cited by examiner

Primary Examiner—Michael G. Lee
Assistant Examiner—Seung H Lee
(74) Attorney, Agent, or Firm—James R. McDaniel

(57) ABSTRACT

This invention relates to digital transmitter cover sheets. Such systems of this type, generally, employ a cover sheet that authenticates the user of the digital transmitter, provides information regarding the auto-routing transmittal of the document to the desired recipient, and provides information regarding any post-processing of the document.

10 Claims, 2 Drawing Sheets

DOCUMENT AUTO-ROUTING USING A DIGITAL TRANSMITTER COVER SHEET

FIELD OF THE INVENTION

This invention relates to digital transmitter cover sheets. Such systems of this type, generally, employ a cover sheet that authenticates the user of the digital transmitter, provides information regarding the auto-routing transmittal of the document to the desired recipient, and provides information regarding any post-processing of the document.

DESCRIPTION OF THE RELATED ART

Many peripherals to computer networks include a scanner component. One example of such a peripheral is an "All-in-one", also known as a multi-functional product (MFP). A MFP has the capability to perform the multiple functions of scanning hardcopy documents, copying, printing or the like. Another example is a digital network copier that scans in documents from an automatic document feeder (ADF), does high volume copying, and has the capabilities of binding, collating, folding, stacking, stapling, stitching, edge-trimming, paginating, and printing on substrates of varied composition. Each of these peripherals, when in communication with an interconnecting network, can also be described as being a digital transmitter device.

The digital transmitter device is an appliance that has an input device, such as a keyboard, a display, and a scanner. The digital transmitter device need not have a printing device. It should be noted that a digital camera is a type of digital transmitter device, but in comparison to the foregoing, it is not a useful for handling documents and, typically, lacks the resolution and ability to rapidly and repetitively transfer information after scanning to a repository.

In an exemplary digital transmitting operation, a hardcopy of the document or other physical object can be presented to the scanner portion of a digital transmitter device. After scanning, a digital transmitter device transforms the scanned image into a digital representation that is then saved in a digital format, such as in a bitmap data format or in a Portable Document Format (PDF). Electronic messaging can be used to send an electronic mail (e-mail) from the digital transmitter device with an attachment of the digitized representation in the data format. The e-mail can be sent to recipients over an interconnecting network, where the recipients have an e-mail address that the user manually enters at the digital transmitter device or that a specific user specifies using a predefined list of recipient e-mail addresses that can be stored in the memory of the digital transmitter device.

Prior to the present invention, as set forth in general terms above and more specifically below, it is known in the facsimile telecommunication art, to employ a sender-based facsimile store and forward facility. Exemplary of such prior art is U.S. Pat. No. 5,404,231 ('231) to M. C. Bloomfield, entitled "Sender-based Facsimile Store and Forward Facility." The '231 reference teaches the generation of a cleaned-up, printed version of a handwritten facsimile cover sheet. The printed version, along with the document to be transmitted, is scanned by the facsimile device to determine a destination of the document. The facsimile device stores the scanned information and keeps trying the contact number of the recipient until the facsimile device gets through to the destination of the recipient. While this system is able to forward the document to the desired recipient, the handwritten cover sheet must first be cleaned up before the document can be forwarded. Also, this system does not provide for any authentication of the user. Finally, this system does not provide for any post-processing of the document, i.e., programming how the work flow system handles this document. Therefore, a more advantageous system, then, will be provided if the cover sheet could be utilized in a variety of media handling devices, provided authentication of the user, avoided the use of a cleaned up cover sheet, and provided information regarding any post-processing of the document.

It is apparent from the above that there exists a need in the art for a manually prepared cover sheet that is capable of being utilized in a variety of media handling devices, and which provides authentication of the user, but which at the same time provides information regarding any post-processing of the document. It is a purpose of this invention to fulfill this and other needs in the art in a manner more apparent to the skilled artisan once given the following disclosure.

SUMMARY OF THE INVENTION

Generally speaking, this invention fulfills these needs by providing a method for using a digital transmitting device to authenticate a user, transmit a document, and carry-out post-processing instructions, wherein the method is comprised of the steps of: entering information on an actual user personalized cover sheet regarding a destination and post-processing instructions, if any, of a document to be transmitted by a digital transmitting device; scanning the cover sheet and the document by the digital transmitting device; authenticating a user by the digital transmitting device; transmitting the document to a recipient; and carrying out the post-processing instructions.

In certain preferred embodiments, the entering information step is further comprised of the steps of: preparing/entering the user identification for later authentication of the user; embedding codes/tags in the cover sheet that help to identify/authenticate the user; manually entering information onto the cover sheet regarding the contact information of the recipient; and manually entering instructions onto the cover sheet regarding any post-processing of the document. Also, the cover sheet can be any durable media that is capable of being marked upon by the user. It is to be understood that the cover sheet can also be constructed so as to be reusable. Also, the post-processing instructions can be, but are not limited to, forwarding the document to a web page, forwarding the document to a optical character recognition (OCR) application, forwarding the document to an archival application, binding, collating, folding, stacking, stapling, stitching, edge-trimming, paginating, printing on substrates of varied composition further image transforms, re-transmission after transform, file format translations or the like. Also, the codes/tags can be, but are not limited to, bar codes, hand-written signatures, or the like. Also, the contact information of the recipient can be, but is not limited to, e-mail address of the recipient, network address of the recipient, the telephone number of the recipient or the like. Also, the user authentication step comprises the step of comparing the actual cover sheet scanned by the digital transmitting device with the previously stored cover sheet data for that user. One other possible use of the authentication step is to download customized settings to the transmitter device based on defaults set up by a particular user i.e., file format preferences, default destinations, default processing steps, etc. Finally, the step of carrying out the post-processing instructions is further comprised of the step of forwarding the document to another location/device for further processing, such as a Web site or a server running an OCR or an archival application.

In another further preferred embodiment, a manually prepared, user personalized digital transmitting device cover sheet is utilized that provides authentication of the user, enables a document to be forwarded to a desired recipient, and provides instructions regarding any post-processing of the document.

The preferred cover sheet, according to this invention, offers the following advantages: ability to be used in a variety of digital transmitting devices; authentication of the user; ability to provide post-processing instructions of the document; ability to provide document recipient information; ability to allow the user to manually prepare the cover sheet; increased security; ease-of-use; and excellent economy. In fact, in many of the preferred embodiments, these factors of ability to be used in a variety of digital transmitting devices, authentication of the user, ability to provide post-processing instructions of the document, ability to allow the user to manually prepare the cover sheet, increased security, and ease-of-use are optimized to an extent that is considerably higher than heretofore achieved in prior, known cover sheets.

The above and other features of the present invention, which will become more apparent as the description proceeds, are best understood by considering the following detailed description in conjunction with the accompanying drawing FIGURES, wherein like characters represent like parts throughout the several views and in which:

DETAILED DESCRIPTION OF THE INVENTION

Figure 1A:
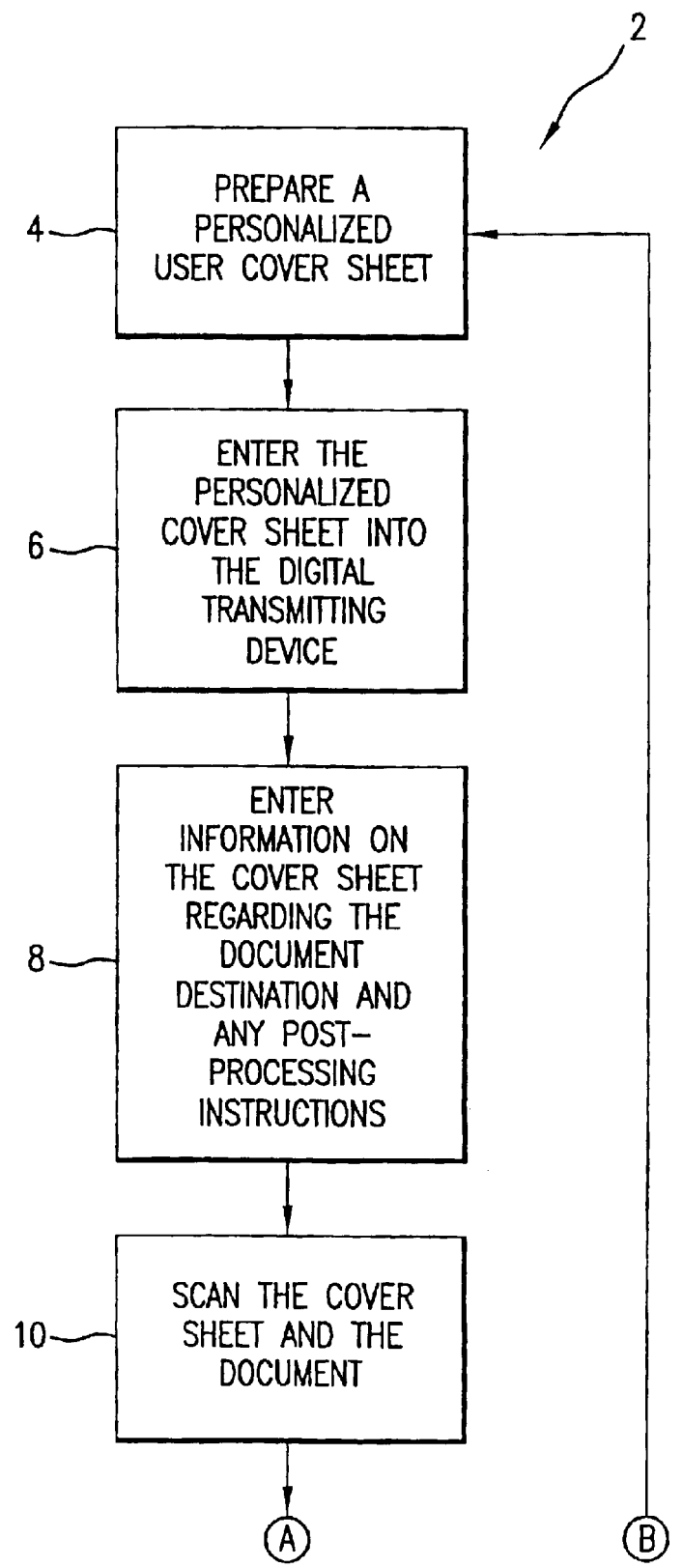
FIGS. 1A and 1B are a flowchart that illustrates a method for using a digital transmitting device cover sheet for user authentication, document auto-routing, and document post-processing.
Figure 1B:
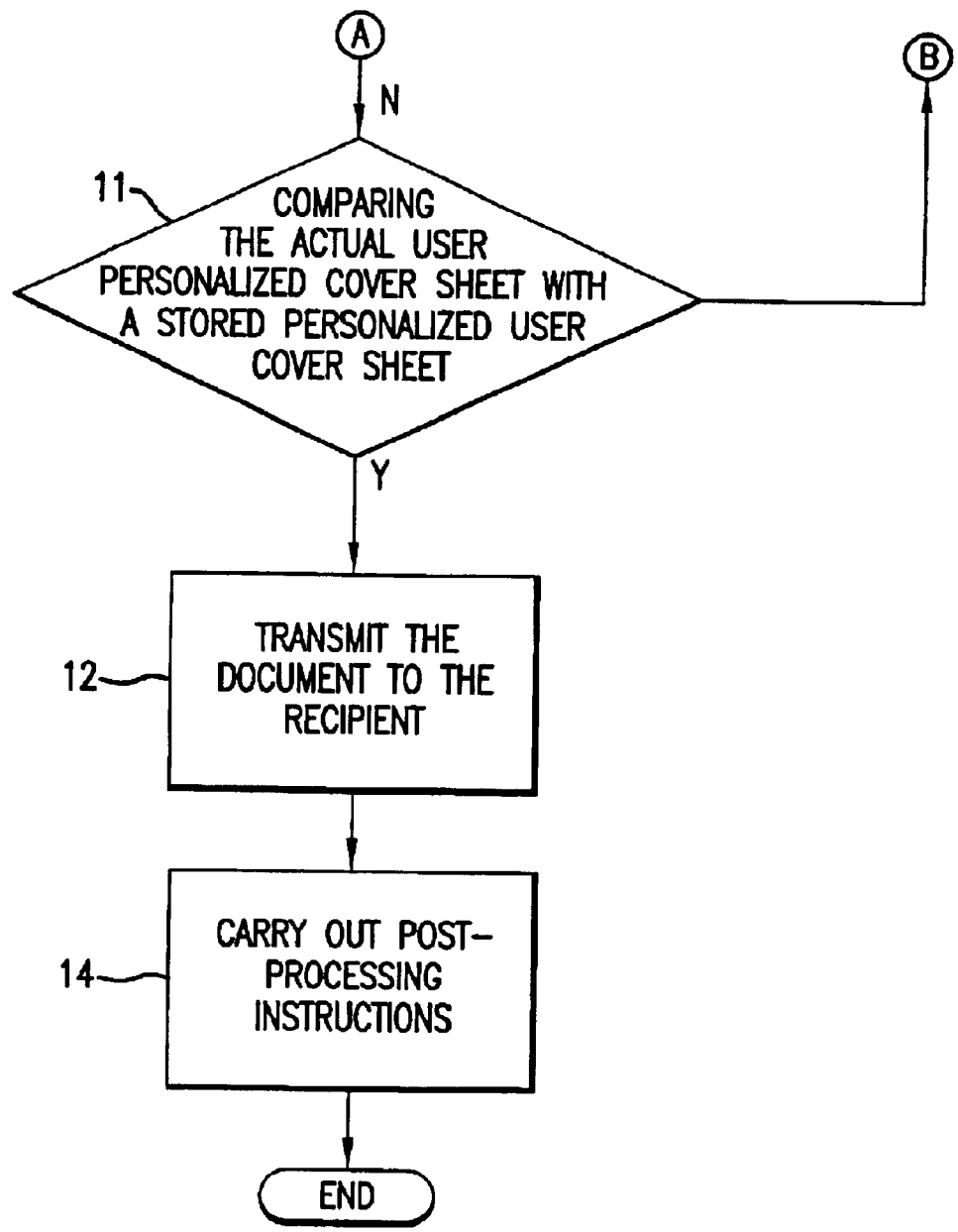

With reference to FIGS. 1A and 1B, there is illustrated one preferred embodiment for use of the concepts of this invention. FIGS. 1A and 1B illustrate method 2 for using a digital transmitting device cover sheet for user authentication, document auto-routing, and document post-processing. Method 2 includes, in part, the steps of: having the user prepare a user personalized cover sheet (step 4); having the user enter the personalized cover sheet into the digital transmitting device for later authentication of the user (step 6); having the user enter/store information on an actual user personalized cover sheet regarding a destination of the recipient of the document and, if necessary, any document post-processing instructions (step 8); scanning the completed, actual user personalized cover sheet and document through the digital transmitting device (step 10); authenticating the user (step 11); transmitting the document to the desired recipient (step 12); and carrying out any post-processing instructions (step 14).

With respect to step 4, there are many ways in which a user can prepare a user personalized cover sheet. For example, codes, such as bar codes, may be embedded in the cover sheet. It is to be understood that the codes or other such identifiers should be capable of allowing the digital transmitting device to recognize the user and, later, authenticate that the user is using the digital transmitting device.

It is to be further understood that the user could enter personal settings for the digital transmitting device and/or the recipient's media handling device on the cover sheet. For example, the user may request that all documents printed by the digital transmitting device be duplexed. Also, the user may specify that only a certain type of media, such as transparencies, can be used by the recipient's media handling device.

Finally, it is to be understood that the user scans/enters the user personalized cover sheet into the digital transmitting device and the user personalized information is conventionally stored in the digital transmitting device for later use in authenticating the user. Also, the data from the scanned user personalized cover sheet can be stored off-line from the digital transmitting device, such as in a database that is conventionally accessible to the digital transmitting device.

With respect to the cover sheet, the cover sheet can be any durable media that is capable of being marked upon by the user. For example, the cover sheet can be made of paper or polymeric material. It is to be understood that the cover sheet can also be constructed so as to be reusable if the user or users routinely forward(s) documents to a regular/common recipient.

With respect to step 6, the personalized cover sheet is entered into the digital transmitting device, preferably, by having the digital transmitting device conventionally scan the personalized cover sheet. After the personalized cover sheet has been scanned, the digital transmitting device will then conventionally store the machine-readable data related to the embedded codes/tags for use in authentication of the user.

With respect to step 8, the user, preferably, manually enters information onto the personalized cover sheet regarding a destination of the recipient of the document and, if necessary, any document post-processing instructions. For example, the user may manually write the name, company name, address, telephone number, and facsimile number of the desired recipient on the personalized cover sheet. Also, blank circles and/or blank boxes could be utilized to allow the user to more easily complete the user personalized cover sheet. It is to be understood that once the user has created a personalized cover sheet that is to be re-used, the user can go directly to step 8 without having to complete steps 2–6.

It is to be understood that the user may enter information onto the user personalized cover sheet through the use of a document-handling device. It could be possible to build a "design-your-own" cover sheet capability into a full-featured transmitter, such as a MFP, such as a personal computer. In this manner, the user can conventionally download the personalized cover sheet from the digital transmitting device storage, enter the desired information on the electronic form of the cover sheet, print that completed cover sheet, and proceed to step 10 (FIG. 1A).

It is to be further understood that the user can also enter the e-mail address of the recipient, the network address of the recipient or the like, depending upon the type of media handling devices the recipient desires to receive the document upon. It is to be even further understood that the completed personalized cover sheet will act as a document receipt for the user.

With respect to post-processing instructions, these refer to instructing the digital transmitting device as to how the workflow system handles this document. For example, the user may decide to forward the document to a Web site so that the document will be put into a web page. The user can, preferably, enter information, such as a network address, onto the user personalized cover sheet that instructs the digital transmitting device to scan the document and forward the scanned document to a category in the web page. Also, the user can instruct the digital transmitting device to perform such post-processing as binding, collating, folding, stacking, stapling, stitching, edge-trimming, paginating, and printing on substrates of varied composition.

With respect to step 10, the completed user personalized cover sheet and document are conventionally scanned by the digital transmitting device. It is to be understood that after the completed user personalized cover sheet and document are scanned by the digital transmitting device, the digital transmitting device utilizes a conventional optical character recognition (OCR) system to recognize the manually entered information on the user personalized cover sheet.

With respect to step 11, after the completed user personalized cover sheet and document have been scanned, the digital transmitting device conventionally compares the machine-readable data of the codes/tags on the completed user personalized cover sheet with the machine-readable data of the codes/tags of the previously entered/stored user personalized cover sheet for that user to determine if the user is authentic.

It is to be understood that the term "authenticate" can be used in a variety of ways. For example, if only a particular user is allowed to use the digital transmitting device, this method would assure that only the particular user was using the digital transmitting device. Also, it may be desired that only a particular recipient may receive documents from the user. Again, this system would assure that result. Finally, authenticating the user also prevents an unauthorized user from sending a document in someone else's name.

If the digital transmitting device does not recognize/authenticate the user, a notice can be sent to the user, and if so configured, to the system administrator. For example, a message can be made to appear on the graphical user interface (GUI) of the digital transmitting device informing the user that the user is not authorized to use the digital transmitting device. It is to be understood that conventional other forms of notification can be sent to the user informing the user that the user has not been authenticated or that the user is not authorized to use the digital transmitting device. Once the user has been notified that it is not authorized to use the digital transmitting device, the unauthorized user may have to contact the system administrator, whereupon the system administrator may inform the unauthorized user to proceed to step 4 (FIG. 1A), so that the unauthorized user can prepare his/her own user personalized cover sheet.

It is to be understood that the user could merely walk up to the digital transmitting device, enter a user specific password or other such identifier into the GUI of the digital transmitting device in order to have the digital transmitting device print a copy of the user's personalized cover sheet. The user can then proceed, as described above, in utilizing the digital transmitting device.

With respect to step 12, the scanned document is conventionally forwarded to the desired recipient.

With respect to step 14, the post-processing instructions, if any, are carried out upon the document on the destination device, as discussed above.

Once given the above disclosure, many other features, modifications or improvements will become apparent to the skilled artisan. Such features, modifications or improvements are, therefore, considered to be a part of this invention, the scope of which is to be determined by the following claims.

What is claimed is:

1. A method for using a digital transmitting device to authenticate a user, transmit a document, and carry-out post-processing instructions, comprising the steps of:

entering information on an actual user personalized cover sheet regarding a destination and post-processing instructions, if any, of a document to be transmitted by a digital transmitting device by scanning said prepared, user personalized cover sheet by said digital transmitting device and storing said scanned, prepared, user personalized cover sheet in a database;

scanning said cover sheet and said document by said digital transmitting device;

authenticating a user by said digital transmitting device, wherein said authentication step is further comprised of the step of, comparing said actual user personalized cover sheet with said stored user personalized cover sheet;

transmitting said document to a recipient; and carrying out said post-processing instructions.

2. The method, as in claim 1, wherein said information entering step is further comprised of the step of:

preparing a user personalized cover sheet.

3. The method, as in claim 2, wherein said personalized cover sheet is further comprised of:

barcodes.

4. The method, as in claim 1, wherein said step of carrying out said post-processing instructions is further comprised of the step of:

forwarding said document to a Web site.

5. The method, as in claim 1, wherein said step of carrying out said post-processing instructions is further comprised of the step of:

forwarding said document to a server running an optical character recognition application.

6. A program storage medium readable by computer, tangibly embodying a program of instructions executable by said computer to perform the method steps for using a digital transmitting device to authenticate a user, transmit a document, and carry-out post-processing instructions, comprising the steps of:

entering information on an actual user personalized cover sheet regarding a destination and post-processing instructions, if any, of a document to be transmitted by a digital transmitting device by scanning said prepared, user personalized cover sheet by said digital transmitting device and storing said scanned, prepared, user personalized cover sheet in a database;

scanning said cover sheet and said document by said digital transmitting device;

authenticating a user by said digital transmitting device, wherein said authentication step is further comprised of the step of, comparing said actual user personalized cover sheet with said stored user personalized cover sheet;

transmitting said document to a recipient; and carrying out said post-processing instructions.

7. The method, as in claim 6, wherein said information entering step is further comprised of the step of:

preparing a user personalized cover sheet.

8. The method, as in claim 7, wherein said personalized cover sheet is further comprised of:

barcodes.

9. The method, as in claim 6, wherein said step of carrying out said post-processing instructions is further comprised of the step of:

forwarding said document to a Web site or a server running an OCR or archival application.

10. The method, as in claim 6, wherein said step of carrying out said post-processing instructions is further comprised of the step of:

forwarding said document to a server running an optical character recognition application.

* * * * *